United States Patent

[11] 3,540,476

[72] Inventor William R. Fuerst
 Park Ridge, Illinois
[21] Appl. No. 667,538
[22] Filed Sept. 13, 1967
[45] Patented Nov. 17, 1970
[73] Assignee Eaton Yale & Towne Inc.
 a corporation of Ohio

[54] MOUNTING MANIFOLD FOR DISPENSER VALVES
 7 Claims, 4 Drawing Figs.
[52] U.S. Cl. .................................................. 137/606,
 251/149.5
[51] Int. Cl. .................................................. F16k 19/00
[50] Field of Search ............................................ 137/606,
 614.06; 251/89.5, 149.9

[56] References Cited
 UNITED STATES PATENTS
 1,070,700 8/1913 Knauf............................ 251/149.9
 2,352,434 6/1944 Hoagland...................... 251/149.9X
 2,770,256 11/1956 Krapp............................. 137/614.06
 FOREIGN PATENTS
 175,370 2/1922 Great Britain................. 251/149.9

Primary Examiner—Robert G. Nilson
Attorney—Hill, Sherman, Meroni, Gross & Simpson ABSTRACT: Mounting manifold forming a mounting for the electrically energizable dispenser valves of a drink dispenser and accommodating quick detachment of the valves from the manifold without shutting off the fluid inlet lines or pressures in the dispenser cabinet. The manifold has two inlets leading into one end thereof, one for syrup and the other for water, although it also may have an inlet for carbonated water. Two outlet fittings lead from the opposite end of the manifold forming a support for the dispenser valve block. A shutoff valve is in association with each associated inlet and outlet and is operated by an individual valve stem, to shut off the flow and pressure through the manifold. A locking plate has clamping engagement with the manifold inlets to bring the valve block into tight engagement with the manifold and to retain the dispenser valves to the manifold. The locking plate has a ledge extending over the valve stems of the shutoff valves in the manifold. This ledge is apertured to accommodate the valve stems to extend therethrough and retain the locking plate in a locking position when the manifold valves are open. The valve stems are shown as being threaded in the manifold. As these stems are threaded inwardly along the manifold to close the shutoff valves the locking plate is released to accommodate removal of the dispenser valve block from the manifold without shutting off the pressure lines in the dispenser cabinet.

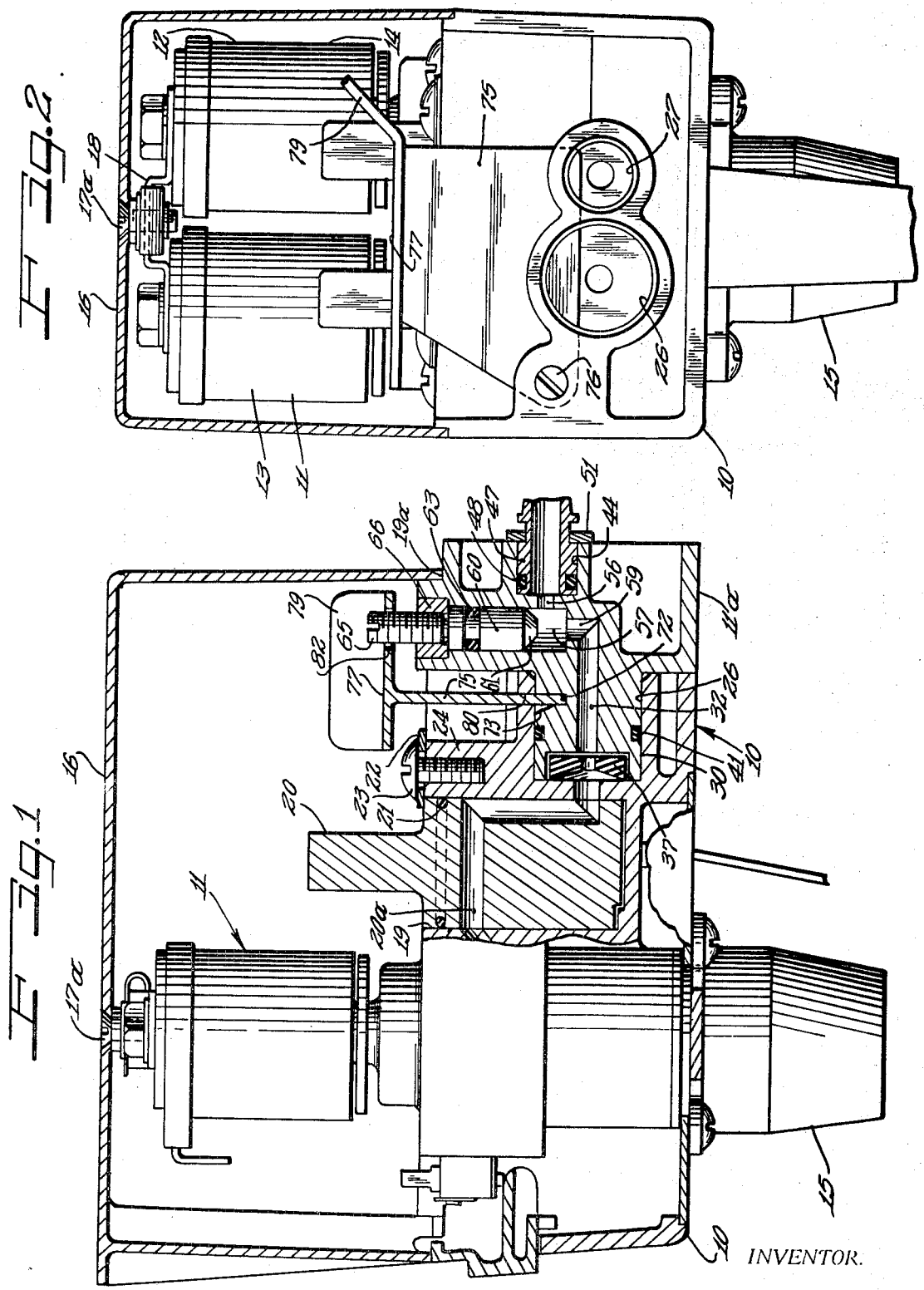

INVENTOR.
William R. Fuerst

3,540,476

MOUNTING MANIFOLD FOR DISPENSER VALVES

SUMMARY AND OBJECTS OF THE INVENTION

In carrying out the present invention I provide a manifold having a series of inlets leading thereinto and a shutoff valve in the manifold in association with each inlet. I also detachably mount the valve block for the dispenser valves on fluid pressure outlets leading from the manifold and lock the valve block to the manifold by a locking plate pivoted to the valve block and held in a locked condition as long as the shutoff valves are open, and only released when the two shutoff valves are closed.

A principal object of the present invention, therefore, is to provide a simple and improved form of mounting means for the dispenser valve of a drink dispenser, accommodating quick removal of the dispensing valve for service, without interrupting the inlet fluid pressure lines supplying fluid to the manifold.

Another object is to provide a simple and improved mounting for the dispensing valves of a drink dispenser, forming passageways for fluid from the dispenser cabinet to the electrically energizable valves of the dispenser, in which the block for the dispenser valves is detachably mounted on outlet fittings leading from a manifold mounted on the dispenser cabinet, and is locked to the manifold as long as outlet pressure flows through the outlet fittings.

A still further object of the invention is to simplify the mounting means for dispenser valves on a dispenser cabinet, by providing a mounting manifold in association with the outlets from the dispenser cabinet, and having shutoff valves controlling the flow of syrup and water through the manifold to the dispenser valves, in which a simplified form of lock plate on the block for the dispenser valves locks the block to the manifold and is releasable only when the shutoff valves in the manifold are in their fully closed positions.

These and other objects of the invention will appear from time to time as the following specification proceeds and with reference to the accompanying drawings wherein:

FIG. 1 is a vertical sectional view taken through a manifold constructed in accordance with the principles of the present invention, showing the mounting for a dispenser valve block on the manifold and the locking means therefore, with a dispenser valve shown in side elevation, and the cover for the valves shown in vertical section.

FIG. 2 is a view looking at the dispenser valves and valve block from the rear end thereof, with the valve block removed from a manifold and the locking plate shown in a locking position.

Figure 3:
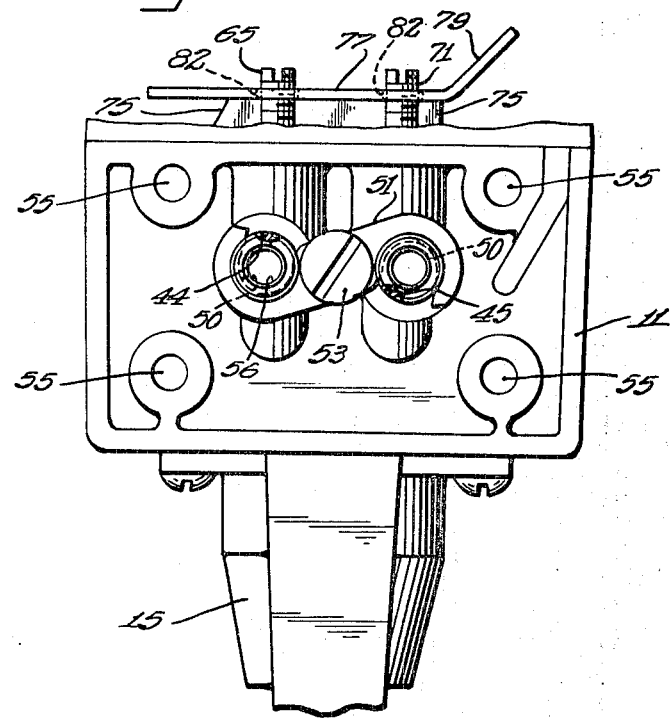
Figure 4:
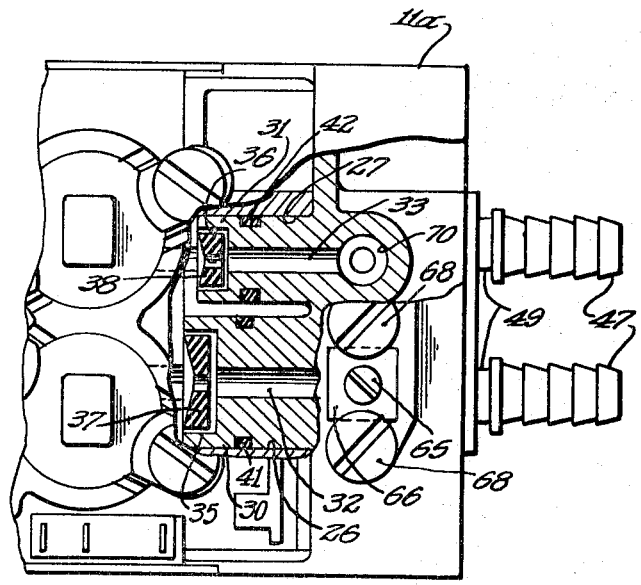

FIG. 3 is a view looking at the rear end portion of the manifold, with the outlet fittings leading from the dispenser cabinet in vertical section and showing the means for clamping the manifold to the outlet fittings; and FIG. 4 is a fragmentary horizontal sectional view of the manifold and dispenser valve body taken substantially along the centers of the outlet fittings and fluid passageways leading therealong.

DESCRIPTION OF PREFERRED EMBODIMENT OF INVENTION

In FIG. 1 of the drawings, I have shown a dispenser valve body 10 mounted on a manifold 11ª, in accordance with the principles of the present invention. The valve body 10 may be made from a conventional thermoplastic material, such as nylon, lucite, or any other suitable material and forms the passageway means and mounting for a syrup valve 11 and a second valve 12, which may be a plain water or carbonated water valve. The valves 11 and 12 may be solenoid operated valves of a conventional form, operated by solenoid coils 13 and 14 respectively, and have communication with a common outlet spout 15, leading from the bottom of the valve body, for discharging a proportioned mixture of syrup and water or syrup and carbonated water of the proper requirements for a preselected soft drink.

A cover 16 extends over the valves 11 and 12 and the respective solenoids 13 and 14 into engagement with the valve body and manifold 11ª, and is secured thereto as by a machine screw 17. The machine screw 17 extends through the top of the cover 16 and is recessed therein and has threaded engagement with a connector bridge 18, midway between the solenoids 13 and 14. The bridge 18 abuts the tops of the casings for the solenoids 13 and 14, and is suitably secured thereto. The cover 16 is also shown in FIG. 1 as extending downwardly along the vertical face of a rear shouldered portion 19ª of the manifold 11ª (FIG. 1).

The valve body 10 is provided with two upwardly opening sockets 19 for passageway plugs 20, sealed to said sockets as by O-rings 21. The plugs 20 each have a passageway 20ª leading therethrough affording inlet communication with the respective valves 11 and 12. Said plugs are removable to accommodate ready cleaning of the valve passageways when desired. The plugs 20 are retained in position by washers 22 and machine screws 23 threaded in a wall 24 of the valve body 10 from the top thereof. The valve body 10 also has spaced parallel inlet sockets 26 and 27 (FIGS. 2 and 4). The sockets 26 and 27 have communication with a respective valve 11 or 12 through the passageways 20ª in the plugs 20. As herein shown, the larger diameter socket is for syrup and has communication with the valve 11 through the associated plug 20. The smaller diameter socket is for water and has communication with the valve 12. A third socket may be provided for $CO_2$ if desired.

The manifold 11ª has connector fittings 30 and 31 extending outwardly therefrom and fitting into the respective sockets 26 and 27 to supply fluid to the valves 11 and 12 respectively and to form a mounting for the valve body on said manifold. As shown in FIG. 4, the connector fittings 30 and 31 have fluid passageways 32 and 33 respectively, leading therealong. The passageways 32 and 33 respectively terminate into axially aligned enlarged diameter flow control chambers 35 and 36, respectively, having annular flow control valves 37 and 38 therein, reacting against shoulders formed by inner end walls of the sockets 26 and 27 in the valve body 10. The flow control valves 36 and 37 are each of a similar form and are formed from a resilient annulus having a central passageway leading therethrough and having recessed downstream faces 39 and 40 respectively, which allow the orifices leading through said flow control valves to restrict upon increases in pressure on the upstream faces of said flow control valves, to maintain a relatively constant flow regardless of variations in pressure. O-ring seals 41 and 42 are recessed within the respective connector fittings 30 and 31 to seal said fittings to the respective sockets 26 and 27.

The mounting plate or manifold 11ª also has inlet sockets 44 and 45 opening thereinto, each of which forms a mounting for a separate connector 47 sealed thereto as by O-rings 48. The connectors 47 provide fluid pressure connectors for connection with a source of syrup and a source of water in the dispenser cabinet. Each inlet fitting 47 has an annular recessed portion 49 extending thereabout and adapted to be engaged by oppositely facing generally U-shaped end portions 50 of a mounting clip 51 pivotally mounted on the back wall of the manifold intermediate its ends, between the connectors 47 on a pivot, in the form of a machine screw 53 (FIG. 3). When the interlocking connection between the clip 51 and the connectors 47 is made, the machine screw 53 may be tightened to positively connect the manifold to the connectors 47. The manifold also has a plurality of threaded bosses 55 in the back face thereof, which may afford a means for securing the manifold to the dispenser cabinet, as by machine screws (not shown).

The inlet socket 44 has communication with a passageway 56 leading into a generally vertically extending valve chamber 57. The valve chamber 57 has a reduced diameter outlet 59 leading from the bottom thereof to the axial passageway 32 leading through the inlet connector 30.

The valve chamber 57 has a valve plug 60 slidably mounted therein having a tapered valve face 61 cooperating with a seat formed between the bottom of the valve chamber 57 and the passageway 59 to form a shutoff valve shutting off the flow of fluid through the passageway 32. An O-ring seal 63 is provided to seal the valve plug 60 to the chamber 57. The valve plug 60 has an integrally formed valve stem 65 extending upwardly therefrom slotted at its upper end to receive a screwdriver and the like and threaded within a nut 66 recessed in the top of the manifold body coaxial with the axis of the valve chamber 57. Screws 68 threaded in the manifold 11" from the top thereof are provided to retain said nut to said manifold. Turning of the valve stem 65 by a screwdriver and the like, will thus move the valve face 61 into engagement with the shoulder formed between the chamber 57 and outlet passageway 59 to shut off the flow of fluid from the passageway 56 through the passageway 32, when it is desired to remove the valve body 10 from a manifold 11".

The inlet socket 45, in a like manner has communication with a valve chamber 70, like the valve chamber 60 and having a shutoff valve (not shown) therein like the shutoff valve 61 and also having an integral threaded valve stem 71, threaded in a nut (not shown) like the nut 66, and adapted to be engaged by a screwdriver to close the valve, when it is desired to remove the valve body from the manifold 11". This shutoff valve and valve stem are exactly like the shutoff valve 61, so a description thereof need not be repeated herein, and the second shutoff valve need not be shown.

The outlet connector 30, leading from the manifold 11", has an upwardly opening slot 72 therein having an inclined forward wedging face 73 adapted to be engaged by a locking plate 75 adapted to draw the valve body along the connector 30 and lock the valve body in place on said connector (FIG. 1). The outlet fitting 31 also has a similar slot (not shown) formed therein engaged by the locking plate 75.

The locking plate 75 extends generally vertically and is pivotally mounted on the valve body 10, adjacent one side thereof, on a pivot pin 76, shown as being in the form of a machine screw threaded in said valve body (FIG. 2). The locking plate 75 also has a ledge 77 extending along the top thereof and beyond opposite sides thereof terminating at one end into an upwardly inclined hand grip portion 79, adapted to be engaged by the hand, to move said locking plate through slots 80 in the connector sockets 26 and 27 into engagement with the slot 72 in the outlet fitting 30 and a similar slot (not shown) formed in the outlet fitting 31. The ledge 77 extends over the valve stem 65 and has apertured portions 82 leading therethrough registering with the valve stems 65 and 73.

When locking the valve body to the manifold 11", the valve 61 is closed and the valve (not shown) associated with the water inlet passageway is also closed. The valve stems are then in their fully retracted positions. The locking plate 75 is then free to pivot about its pivot pin 76, to draw the valve body inwardly along the connectors 30 and 31 and to lock the valve body in position on said connectors. When the locking plate 75 in the locking position shown in FIG. 1, the valve stems 65 and 73 are turned to their fully open positions by a screwdriver or the like to fully open the shutoff valves. When said valve stems are in these positions, they will extend through the openings or apertured portions 82 in the ledge 77. This will lock the locking plate 75 from pivotal movement into a release position and will thereby positively lock the valve body 10 to the manifold 11".

Assuming the valve body has been connected to mounting plate 11" mounted thereon and the dispenser valve is mounted on the manifold in its operative position, with the cover 16 covering the valves 11 and 12, when it is desired to remove the valve body 10 for inspection and repair of the valves 11 and 12, it is merely necessary to remove the machine screw 17 and lift the cover 16 from the valve body and mounting manifold.

The syrup and water valve passageways are then closed by the turning of the valve stems 65 and 53 into positions beneath the bottom of the ledge 77. The locking plate 75 is then released and may be pivoted about the axis of the pivot pin 76 to release the valve body from the outlet connectors 30 and 31. The valve body and valve mounted thereon may then be removed from the mounting manifold, by pulling the valve body in a straight line in a direction away from the manifold.

With such an arrangement the valve body 10 and valves 11 and 12 may be quickly removed from their support for service or cleaning, and the syrup and water lines leading from the dispenser cabinet must be in a closed position prior to releasing the valve body, to be removed from the manifold, making it unnecessary to shut off the fluid inlet lines in the dispenser cabinet.

It should further be understood that the manifold 11" may be of various arrangements, and that the passageways leading through said manifold may include passageways for recirculating carbonated water through the manifold if desired, and that the principal feature in the present invention is the provision of a support manifold for the valve body in which the valve body is always locked to the manifold when the passageways through the manifold are open for the passage of fluid therethrough, and the valve body can only be removed when these passageways are fully closed.

While I have herein shown and described one form in which the invention may be embodied, it may readily be understood that various variations and modifications in the invention may be attained without departing from the spirit and scope of the novel concepts thereof.

I claim:

1. In a mounting for detachably mounting dispenser valves and the like on a source of supply of a drink to be dispensed:
    at least one dispenser valve;
    a valve body for said dispenser valve having at least one inlet leading thereinto;
    a manifold having at least one inlet fluid connection leading thereinto and at least one outlet fluid connection leading therefrom;
    a shutoff valve in said manifold between said inlet and said outlet fluid connections;
    manually operable means on said manifold and relatively movable with respect thereto, for opening and closing said shutoff valve in said manifold;
    an interengaging sealing connection between said outlet fluid connection and said inlet leading into said valve body;
    a locking member pivoted for movement about an axis parallel to the axis of said inlet for movement into and out of locking engagement with said valve body and said outlet fluid connection; and
    said locking member having a portion extending over said manually operable means for opening and closing said shutoff valve and locked from movement by said manually operable means except when said shutoff valve is in a fully closed position, and thereby locking said valve body for said dispenser valve to said manifold as long as said shutoff valve is open to establish a fluid connection between said inlet fluid connection leading into said manifold and said inlet leading into said valve body.

2. A valve mounting in accordance with claim 1, wherein the manually operable means for opening and closing the shutoff valve comprises a valve stem extending above said manifold and intercepting said locking member and the portion thereof extending over said manually operable means, and pivotally movable to accommodate free movement of said locking member into release and locking positions only when the shutoff valve is in a fully closed position.

3. The valve mounting in accordance with claim 2:
    wherein the valve stem has threaded engagement with said manifold and extends above said manifold;
    wherein the mounting member has a portion extending over said valve stem, when the valve is in a closed position; and
    wherein the portion extending over the valve stem is apertured to accommodate the valve stem to pass therethrough, to retain said mounting member for movement to a valve body releasing position except when said valve stem is in a fully retracted valve closing position.

4. The structure of claim 3:
wherein the manifold has a connector leading therefrom;
wherein the outlet fluid connection from said manifold leads through said connector;
wherein the valve body is mounted on said connector;
wherein the connector has a locking slot therein; and
wherein the locking member is a plate pivoted to said valve body and having locking engagement with said locking slot for retaining said valve body to said manifold.

5. The structure of claim 1:
wherein the manifold has parallel spaced inlet fluid connections;
wherein said manifold has parallel spaced outlet fluid connections leading therefrom and having fluid communication with the associated inlet fluid connections;
wherein a shutoff valve is mounted in said manifold in association with each associated inlet and outlet fluid connection, for shutting off the passage of fluid therethrough;
wherein a separate valve stem extends from each shutoff valve above said manifold and is movable inwardly of said manifold to shut off the flow of fluid through said outlet fluid connections;
wherein the locking member is a plate pivoted for locking said valve body to said manifold; and
wherein the valve stems are movable into position to block movement of said locking plate to a release position when said shutoff valves are in their open positions, and only accommodate release of said locking plate from said manifold when said shutoff valves are in their fully closed positions.

6. The structure of claim 5 wherein the locking plate is pivoted to said valve body and has locking connection with said outlet fluid connections.

7. The structure of claim 6:
wherein the valve stems are threaded in said valve body and extend upwardly therefrom; and
wherein the locking plate has a ledge extending over said valve stems when in valve closing positions and apertured to accommodate movement of said valve stems through the apertured portions of said ledge into locking engagement therewith when said valve stems are in their valve opening positions.